PORTABLE TELEPHONE SYSTEM

Filed Sept. 11, 1963 5 Sheets-Sheet 1

INVENTOR

F. H. Blitchington, Jr.

BY R. P. Miller

ATTORNEY

Nov. 15, 1966 F. H. BLITCHINGTON, JR 3,286,184

PORTABLE TELEPHONE SYSTEM

Filed Sept. 11, 1963 5 Sheets-Sheet 3

Nov. 15, 1966 F. H. BLITCHINGTON, JR 3,286,184

PORTABLE TELEPHONE SYSTEM

Filed Sept. 11, 1963 5 Sheets-Sheet 4

United States Patent Office 3,286,184

Patented Nov. 15, 1966

3,286,184

PORTABLE TELEPHONE SYSTEM

Frank H. Blitchington, Jr., Greensboro, N.C., assignor to Western Electric Company, Incorporated, New York, N.Y., a corporation of New York Filed Sept. 11, 1963, Ser. No. 308,196

5 Claims. (Cl. 325—16)

This invention relates to a portable telephone system and more particularly to a telephone system wherein R.F. and audio signals are simultaneously transmitted between a portable transmit-receive unit and an inductively coupled stationary control unit that is connected to a standard telephone transmission line.

Presently, portable telephone units are selectively connected to a telephone line by wiring a building to provide a plurality of plug-in-jacks. When the telephone unit is connected through a jack, the portability of the telephone unit is limited by the length of the connecting cord. Another limitation on the portability of such system is the number of jacks provided. In effect such systems are only of limited portability.

Other systems have been developed using radio-frequency to communicate between mobile units and a fixed station. These systems are subject to limitations such as assignment of specific broadcast frequencies, high power consumption, and in certain systems using a single frequency, inability to permit simultaneous transmission and reception. Another system contemplates an inductive coupling between the portable telephone unit and a stationary control unit. This system uses audio-frequency but is again subject to many limitations such as the inability to permit simultaneous two-way communication between the portable unit and the stationary control unit.

It is an object of this invention to provide a new and improved portable telephone system.

Another object of this invention is to provide a combined audio-frequency and radio-frequency telephone communication system.

Additionally, it is another object of this invention to provide a portable telephone system wherein the portable unit is inductively coupled to a stationary control unit so that simultaneous conversation can take place between the units.

A further object of the invention resides in the use of a radio-frequency transmitter wherein the output of a transistor, driven by an R.F. oscillator, is modulated in accordance with audio-frequency signals being simultaneously impressed on the collector and emitter of the transistor.

An additional object of the invention is the provision of a portable telephone unit including dialing facilities together with facilities to selectively control a power source located in a stationary unit connected to the standard telephone line.

A still further object of the invention resides in a combined audio and radio frequency communication system having facilities associated with the radio-frequency receiving facilities for simultaneously controlling the gain in the radio-frequency facilities and the volume of the audio-transmitting facilities.

With these and other objects in view, the present invention contemplates a telephone communication system wherein a portable unit is inductively coupled to a stationary control unit to permit simultaneous audio-frequency and radio-frequency communication between the units. When a hand set is lifted on the portable unit, power sources at both the portable unit and the control unit are rendered effective to permit the subsequent transmission of dial pulses from the portable unit to the control unit and from there over an outgoing standard telephone line. Automatic gain control facilities are provided in the control unit to insure the maintenance of the correct audio level of both the transmitted and received signals.

Other objects and advantages of the present invention will be apparent from the following detailed description when considered in conjunction with the accompanying drawings wherein.

Figure 1:
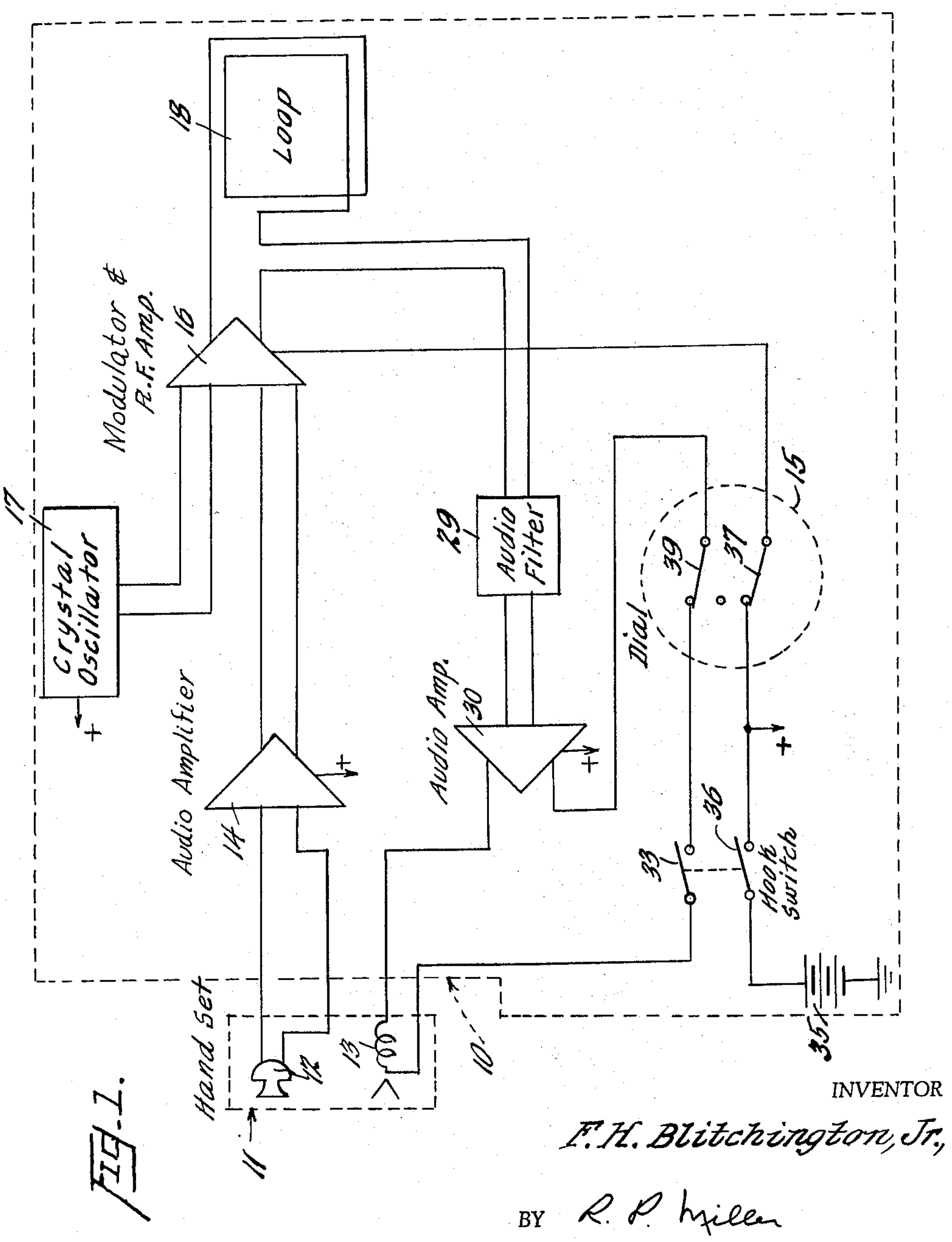
FIG. 1 is a schematic circuit diagram of a portable telephone transmitter-receiver utilizing radio and audio frequencies in accordance with the principles of the invention.

Referring first to FIG. 1, there is shown a conventional telephone unit comprising a portable base 10 and a hand set 11. The hand set 11 includes a transmitter or microphone 12 and a receiver 13. Mounted in the base 10 is a dial mechanism 15.

Figure 2:
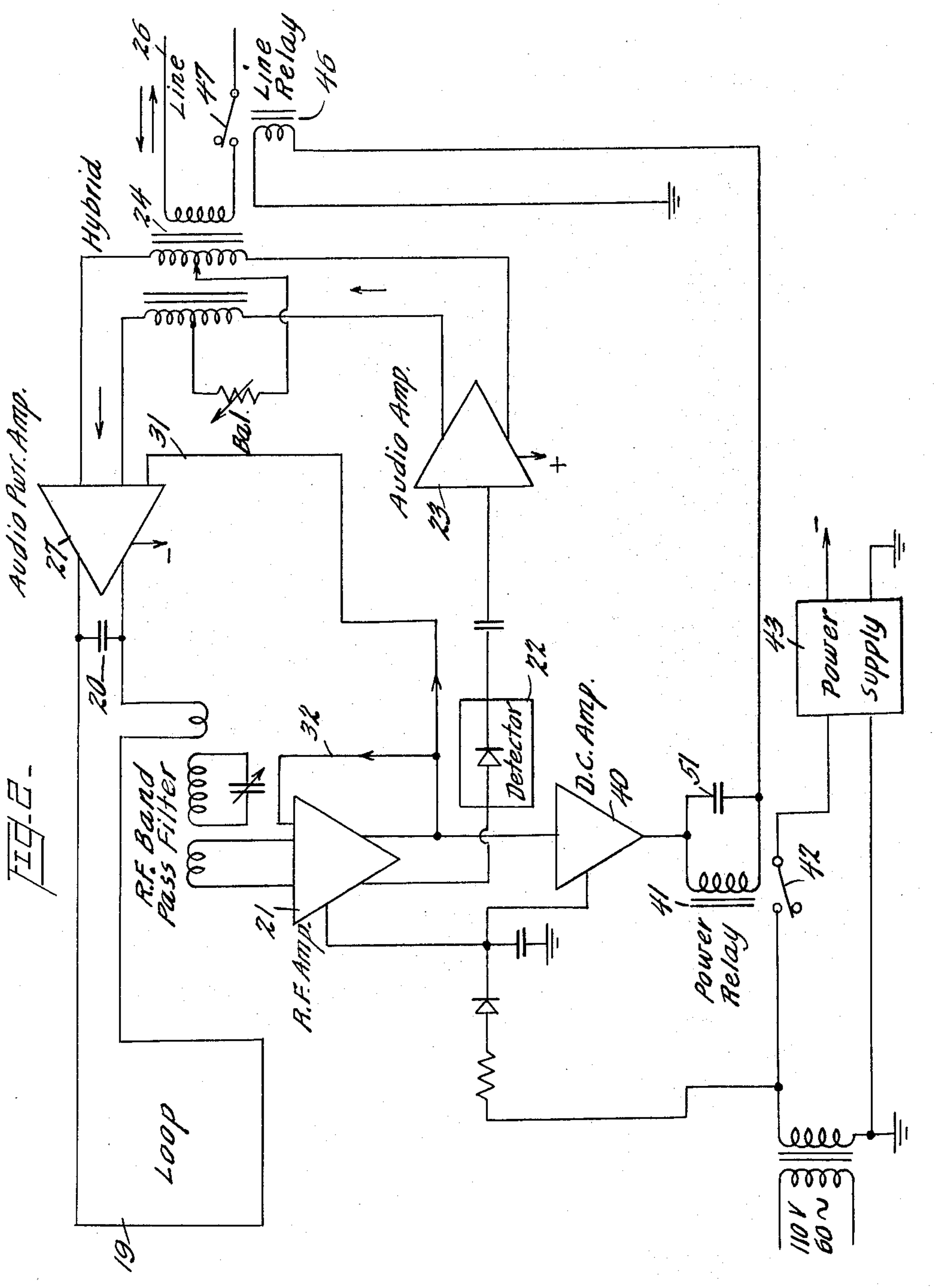
FIG. 2 is a schematic circuit diagram of a stationary control unit for transmitting and receiving audio and radio frequencies in accordance with further principles of the invention.

Initially considering transmission, sounds impressed on the transmitter 12 result in the generation of audio-frequency signals that are applied to an audio amplifier 14 which feeds the signals to an R.F. amplifier-modulator 16 wherein the audio signals modulate the output of a crystal R.F. oscillator 17. The modulated R.F. signals are impressed on an inductive loop 18 mounted in the portable base 10. Loop 18 is inductively coupled to a loop 19 which is located in a stationary control unit, as shown in FIG. 2. Loop 19 may be located about the foundation of a building or about any area in which it is desired to use the portable communication device. A capacitor 20 is connected across an audio power amplifier 27 and serves to bypass the R.F. energy.

The R.F. signals received in the loop 19 are filtered and applied to an R.F. amplifier 21, whereafter the signals are demodulated by a diode or other detector 22 and impressed upon an audio amplifier 23, which in turn applies the audio signals to a hybrid coil 24. The hybrid coil is of conventional design and is inductively coupled to a standard telephone transmission line 26.

Considering now reception, input audio signals received over the line 26 are impressed through the hybrid coil 24 to an audio power amplifier 27 and from there are impressed on the loop 19. Due to the inductive coupling between the loops 18 and 19, the audio signals are picked up by the loop 18 and applied through an audio signal filter 29 to an audio amplifier 30, whereafter the audio signals are impressed on the receiver unit 13.

Returning now to a consideration of the signals emanating from the R.F. amplifier 21, these signals are applied to an automatic voltage control circuit having two branches 31 and 32. The branch 32 feeds back a voltage to control the gain or output of the R.F. amplifier 21. The feedback over the circuit branch 31 maintains the level of the audio amplifier 27 at a constant value to compensate for variations in the distance of the coupling between the loops 18 and 19.

In order to initiate a telephone conversation, the hand set 11 is lifted whereupon a pair of hook switch contacts 33 and 36 are closed. Closure of the lower hook switch contact 36 completes circuits to connect a battery source 35 to the crystal oscillator 17, the audio amplifier 14, the audio amplifier 30, and over a line running through a lower interrupter contact 37 located in a telephone dial 15 to the R.F. amplifier-modulator 16. Application of battery through the interrupter contact 37 to the R.F. amplifier-modulator 16 permits the signal from the crystal oscillator 17 to be applied to the loop 18. Receipt of the signal in the loop 19 results in the operation of the R.F. amplifier 21 to apply a control signal through a D.C. amplifier 40 to energize a power relay 41. Energization of relay 41 draws up contacts 42 to apply power from a power supply 43 to the audio power amplifier 27. The circuit running to the power relay 41 also runs to a line relay 46 to draw up a contact 47 located in the telephone line 26.

In order to call a desired subscriber, the dial 15 is operated to open the contact 37. The successive openings of the contact 37 in response to the dialing of particular numbers are impressed on the R.F. amplifier-modulator 16 to interrupt the signals impressed on the loop 18 by the oscillator 17. These interruptions of the signal are picked up by the loop 19 and impressed through the R.F. amplifier 21, and through the D.C. amplifier 40, to the line relay 46. The line contact 47 is thus successively opened and closed in response to the opening and closing of contact 37 in the dial 15. In order to maintain on the power supply 43 during dialing of a telephone number, a capacitor 51 is connected in parallel with the power relay 41 so that the momentary interruptions of the circuit will not affect the release of the power relay.

Figure 3:
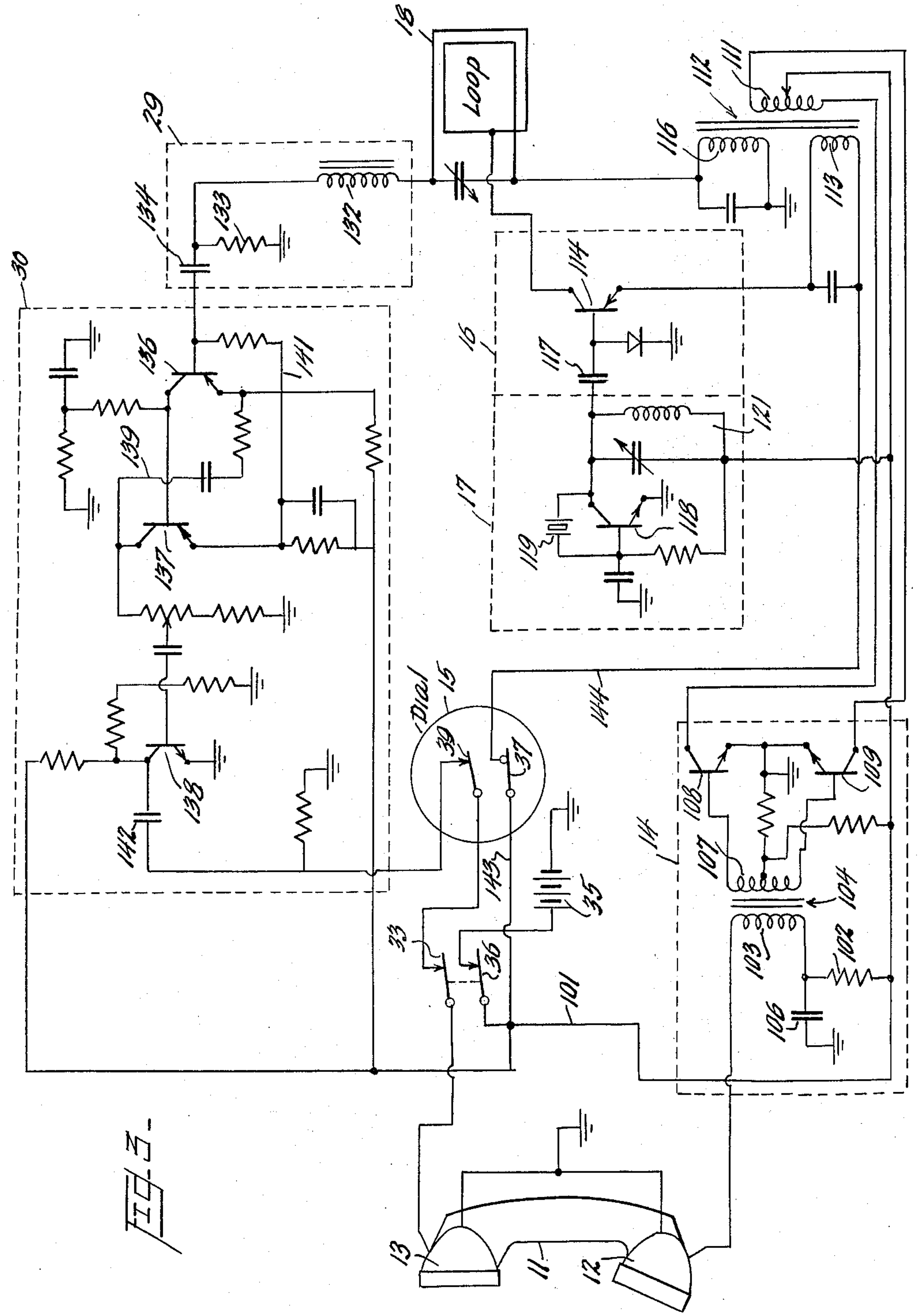
FIG. 3 is a detailed circuit diagram of the portable transmitter-receiver shown in FIG. 1.

Referring now to FIG. 3 wherein the details of the circuit located in the portable telephone unit are shown; the lifting of the receiver 11 results in the closure of the hook switch contacts 33 and 36 to complete a circuit from the battery 35, through the closed hook switch contact 36, over a lead 101, through a current limiting resistor 102, through a primary 103 of a modulator transformer 104, through the transmitter 12 to ground. The resistor 102 serves to limit the current supplied to the microphone 12. The current in the primary 103 is accordingly varied in response to impingement of sound energy on the transmitter in accordance with well-known principles. A capacitor 106 is connected across the resistor 102 to insure that the audio signals impressed on the tranmitter 12 appear across the transformer 103 and not across the resistor 102.

Considering now the modulation of R.F. signals applied to the loop 18, a secondary 107 of the transformer 104 is connected to the bases of a pair of transistors 108 and 109 coupled together in push-pull fashion to serve as the transistor amplifier 14 for the audio signals emanating from the transmitter 12. The collectors of the transistors 108 and 109 are respectively connected to the top and bottom windings 111 of a modulator output transformer 112. A first secondary winding 113 of the transformer 112 is connected to the emitter of a transistor 114 included in the R.F. amplifier-modulator 16. An additional secondary winding 116 of the transformer 112 is connected through the look 18 to the collector of the transistor 114. It will be appreciated that varying audio signals appearing in the primary 111 will be picked up by the secondary windings 113 and 116 to cumulatively control the output of the transistor 114. The transistor 114 is connected through a coupling capacitor 117 to the oscillator 17 comprising a transistor 118, a crystal 119, and a tuned circuit 121. Oscillator 17 impresses R.F. carrier signals on the base of the transistor 114 which are accordingly modulated in accordance with the amplified audio signals picked up by the secondary windings 113 and 116 and impressed upon the collector and emitter of the transistor 114.

Turning now to the receiving circuit in the portable unit, shown in FIG. 3, incoming audio signals picked up by the loop 18 which is inductively coupled to the loop 19, are impressed through an audio filter 29 comprising a choke 132, a resistor 133, and a capacitor 134. The filtered audio output is impressed through the audio amplifier 30 which comprises three transistors 136, 137, and 138. In order to stabilize the functioning of the amplifier 30, the collector of the transistor 137 is connected through an A.C. feedback circuit 139 to the emitter of the transistor 136. Further stabilization is attained by connecting the emitter of the transistor 137 through a D.C. feedback circuit 141 to the base of the transistor 136. The output of the last transistor 138 is impressed through a capacitor 142, through the closed dial contacts 39, through the hook switch contact 33, through the receiver 13 to ground. The amplified audio signals control the receiver to produce audible sounds in accordance with well-known principles.

When initially dialing a subscriber's number, the operation of the dial 15 effectuates the opening and the closing of the interrupter contacts 37. It will be noted that battery 35 is connected through the hook switch contact 36, over a lead 143, through the interrupter contact 37, over a lead 144 and through the secondary winding 113 to the emitter of the transistor 114. It may be thus understood that the emitter current for the transistor 114 passes through the contact 37 which is intermittently opened and closed in accordance with the digits dialed. Obviously, upon interruption of the emitter circuit of the amplifier-modulator 16, the R.F. signals derived from the oscillator 17 are not impressed on the loop 18. These interruptions indicative of the dialed digits are picked up by the stationary loop 19.

Figure 4:
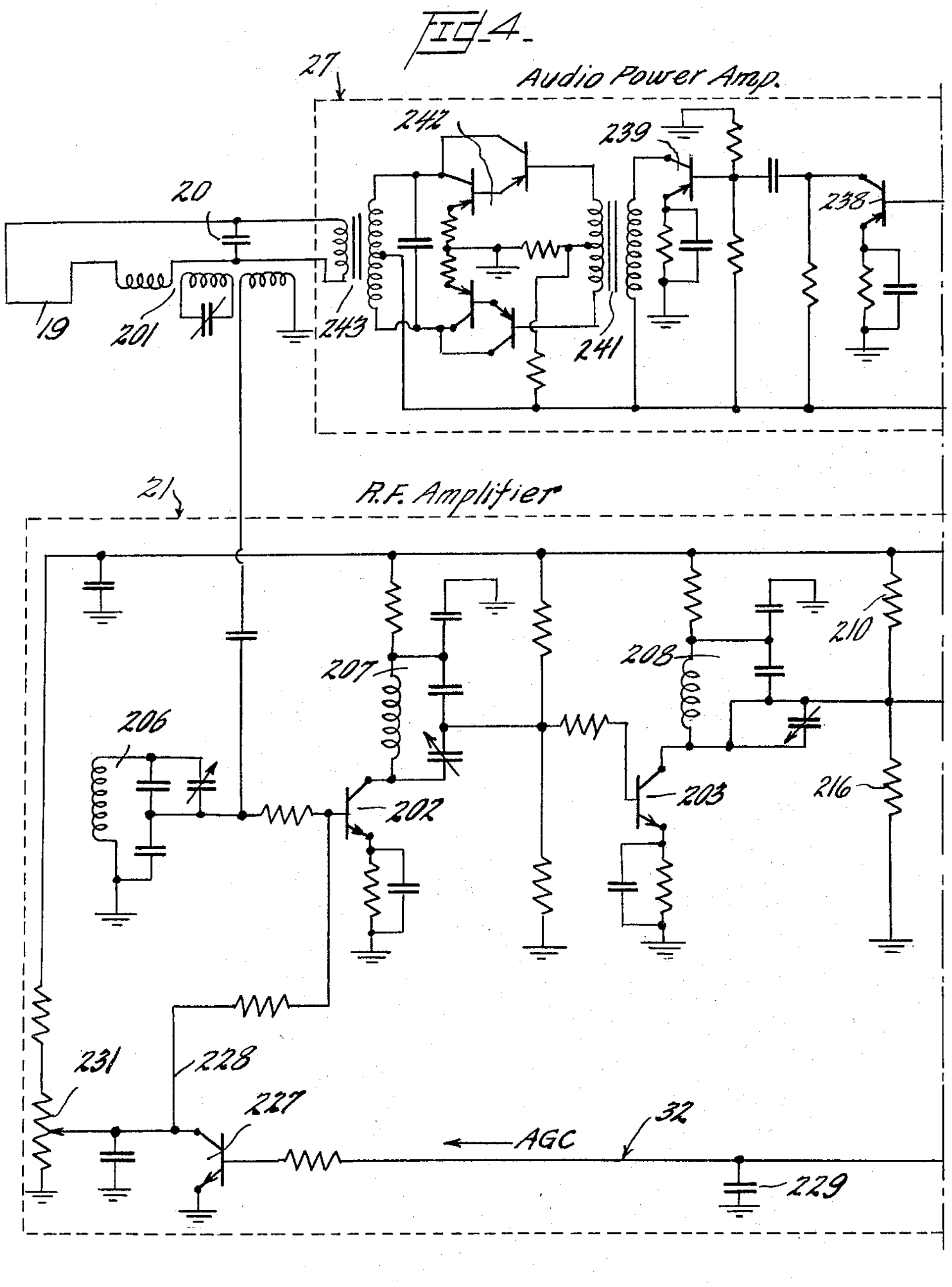
FIGS. 4 and 5, when arranged as depicted in FIG. 6, represent a detailed circuit diagram of the stationary control unit shown in FIG. 2.
Figure 5:
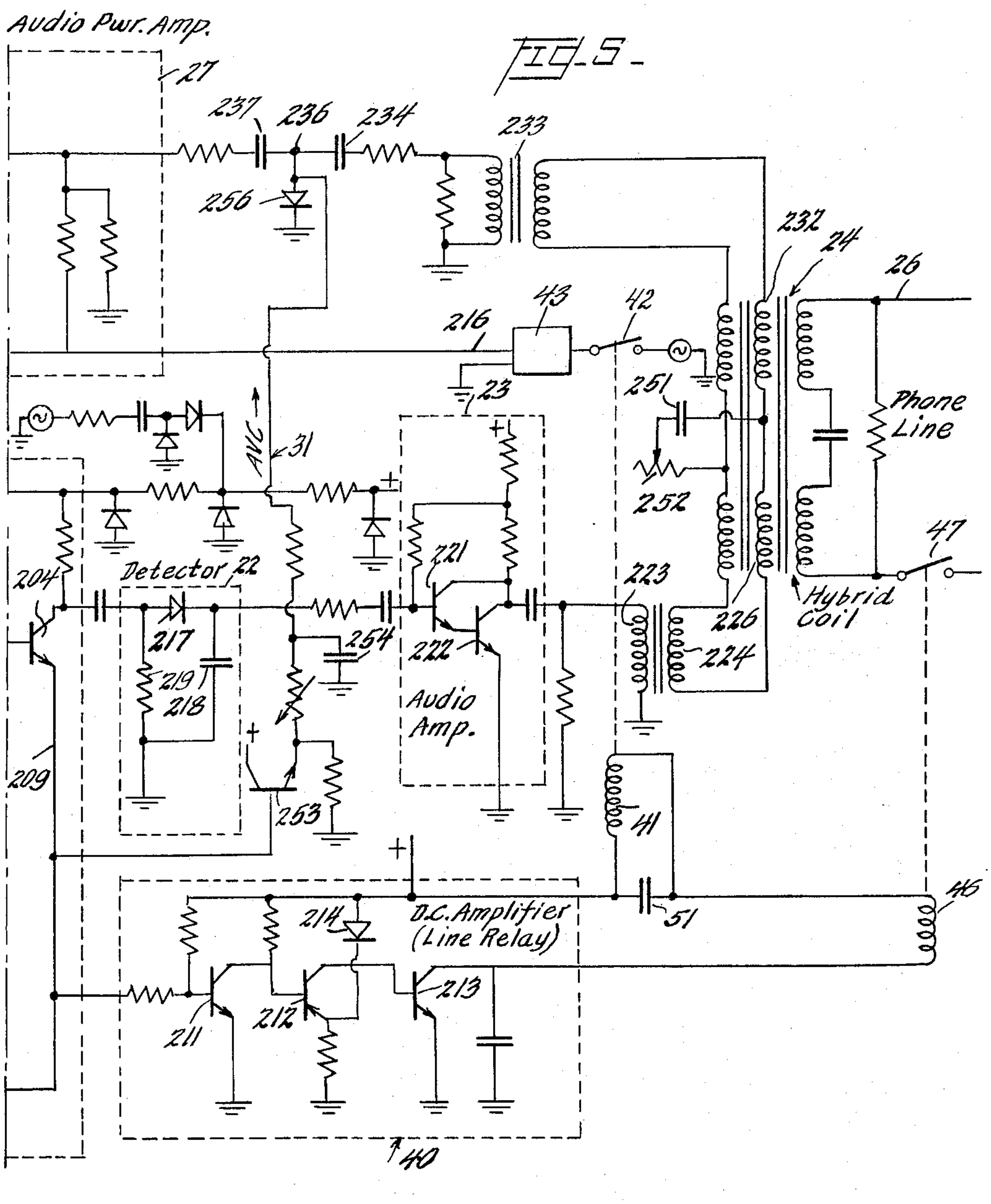
Figure 6:
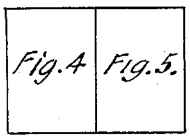

Attention is now directed to the circuit details of the stationary transmit-receive unit shown in FIGS. 4 and 5, which functions to transmit to, and receive signals from, the portable unit shown in FIG. 3 which signals are derived from, or applied to, the telephone line 26. This unit is initiated into condition for operation by lifting the receiver 11 to effectuate the closure of the hook switch contact 36, whereupon battery is applied to the transistor 114, which then functions in conjunction with the oscillator 17 to impress R.F. signals on the loop 18. These R.F. signals are received by the loop 19 and impressed through an R.F. band-pass filter 201, tuned to respond to signals that are in accordance with the designated radio frequency. These initial R.F. signals are impressed through the R.F. amplifier 21 which consists of three transistors 202, 203, and 204, respectively, associated with LC tuned circuits 206, 207, and 208. Inasmuch as each transistor within the amplifier 21 is associated with a tuned circuit, only R.F. signals of the designated frequency are passed to the detector 22. A resistor 210 of a relatively high resistance value is connected in the base circuit of the transistor 204 to hold this transistor from conduction until such time as the R.F. signals appear in the amplifier 21.

The base-emitter junction of the transistor 204, together with a resistor 216 and a capacitor 229, function as a detector for signals applied to the base of the transistor 204. The detector applies a D.C. signal to a lead 209, the signal being proportional to the level of the output of the transistor 204. Such D.C. signals appearing in lead 209 are applied to the D.C. amplifier 40 wherein the signals are amplified by transistors 211, 212, and 213 operating in conjunction with a diode 214. D.C. current flowing through the diode 214 passes through the transistors 212 and 213 to operate the line relay 46. Operation of relay 46 functions to close the line relay contact 47 to complete a sending circuit through the outgoing telephone line 26. After a short delay, the capacitor 51 is charged thus allowing the relay 41 to operate and close the contact 42. Closure of the contact 42 applies negative battery from the power supply 43 over a lead 216 to enable the audio power amplifier 27 to operate.

Upon dialing of each digit of the subscriber's number, the interruption of the R.F. signal received in the loop 19 results in the accompanying deenergization of the line relay 46. Each deenergization of the relay 46 corresponds to a dial pulse and is impressed on the telephone line 26 by the opening and closing of the contact 47. Inasmuch as the relay 41 is shunted by the capacitor 51, this relay does not follow the dial pulses so that the contact 42 is held closed. Upon receipt of the R.F. signals modulated in accordance with the sound to be transmitted, the modulated R.F. signals are passed through the R.F. amplifier 21 to the detector 22. The detector includes a diode 217, a capacitor 218, and a resistor 219. The detector 22 functions in the usual manner; that is, during positive going half cycles of the R.F. signals, the capacitor 218 is charging; whereafter during the negative going half cycles, the capacitor 218 is holding the diode 217 from conduction. The voltage developed across the capacitor follows the peak value of the applied voltage and reproduces the original audio-frequency modulation developed from the sound impressed on the transmitter or microphone 12.

The demodulated signals indicative of the sounds to be transmitted, are applied to the amplifier 23 consisting of transistors 221 and 222. The amplified signals are then impressed on an input winding 223 of the hybrid coil 24. A secondary winding 224 picks up the signals and inductively applies them through lower windings 226 to line 26.

Returning now to a consideration of the circuit used to control or maintain the sound level, the transistor 204 has an emitter coupled over leads 209 and 32, through a transistor 227, and over a lead 228 to the base of the transistor 202. The capacitor 229 is connected to the lead 32 to act as a filter to permit a D.C. bias to be applied to the base of transistor 227. The transistor 227 is connected in parallel with the lower portion of a voltage divider 231 which functions to control the bias applied to the base of the transistor 202. As the R.F. signals increase in strength or amplitude, the transistor 204 is driven into a greater state of conduction, hence, the potential applied over leads 209 and 32 increases to drive the transistor 227 into a greater state of conduction. Inasmuch as the transistor 227 is connected in parallel with the lower half of voltage divider 231, the bias is lowered on the base of transistor 202, hence, lowering the gain of the amplifier 21.

Considering now the receiving circuit shown in FIGS. 4 and 5, the incoming audio signals are received on the line 26 and are inductively passed through upper windings 232 of the hybrid coil 24 to a transformer 233. The output of the transformer 233 is passed through a capacitor 234, a junction point 236, and a capacitor 237 to the audio power amplifier 27. The audio power amplifier 27 includes a pair of transistors 238 and 239 which function to apply amplified signals to a transformer 241 that has its output applied to a push-pull power amplifier 242. The output of the push-pull power amplifier 242 is impressed through a transformer 243 to a line running to the loop 19. The loop 19 is inductively coupled with loop 18, which picks up and applies the audio signals to the audio filter 29 and the audio amplifier 31 to accordingly reproduce the audible sounds in the receiver 13.

The hybrid coil 24 also includes a capacitor 251 and an adjustable resistor 252. The resistor 252 may be adjusted to prevent cross-talk between the sending and receiving circuits. The adjustment is such that there is not an absolute balance so that a small amount of sidetone is provided whereby the speaker, talking into the microphone 12 can hear himself talk in the receiver 13.

In order to maintain the audio signals at a suitable level, the automatic voltage control line 31 is provided. This lead 31 includes a transistor 253 and a capacitor 254. The capacitor 254 is selected with a long-time constant to limit variations in gain, and thus eliminate any effect of the dial pulses. When the transistor 204 commences to heavily conduct, which is indicative of a too-high volume, then a positive going control signal is impressed over the lead 209, through the transistor 253 and over the lead 31, to the junction 236. The appearance of increased positive potential at the junction 236 tends to increase the conduction of a diode 256. The increase in conduction of the diode 256 is accompanied by a decrease in the volume or amplitude of the incoming audio signals impressed through the capacitor 234 to the junction 236. It may be thus appreciated that both the sending and receiving circuits of the stationary control unit shown in FIGS. 2, 4 and 5 are controlled to maintain the signal level of both the transmitted and received signals. For example, when the loop 18 is moved closer to the loop 19, the coupling between these loops increases and the signal level will accordingly increase; however, the circuits 31 and 32 cooperate to hold the signal level output at a constant value.

It is to be understood that the above-described arrangements of circuits and construction of electrical components are simply illustrative of an application of the principles of the invention and many other modifications may be made without departing from the invention.

What is claimed is:

1. In a combined audio-radio frequency telephone system for receiving and impressing audio signals on a telephone line, a first unit having a first inductive loop,
a transmitter and a receiver in said first unit,
means interposed between said transmitter and said first inductive loop for generating R.F. signals modulated in accordance with signals impressed on said transmitter,
an audio amplifier means interposed between said first loop and said receiver for amplifying audio frequency signals received in said first loop,
a second inductive loop inductively coupled to said first inductive loop,
means for tuning said second loop to respond to said generated R.F. signals,
a normally open contact in said telephone line,
means responsive to the receipt of an R.F. signal in said second inductive loop for closing said open contact,
a normally deenergized audio power amplifier means interposed between said telephone lines and said second inductive loop,
means responsive to said receipt of R.F. signals for energizing said audio power amplifier, and
means for holding said audio power amplifier energized during momentary interruptions of said R.F. signals.

2. In a combined audio-radio frequency transmit-receive system for communicating between a first unit and a telephone line, a transmitter and a receiver in said first unit,
a first loop mounted in said first unit,
an audio power amplifier connected between said first loop and said receiver for amplifying audio signals received in said first loop,
a radio frequency amplifier including a transistor having a base, an emitter, and a collector,
means for applying a radio frequency carrier signal to said base to drive said amplifier,
means for connecting said collector to said first loop,
means connected to said transmitter for simultaneously applying modulating signals to said emitter and collector in accordance with signals impressed on said transmitter,
a second loop inductively coupled to said first loop,
means for impressing audio signals appearing on said telephone line on said second loop, and
means connected to said second loop for demodulating received radio frequency signals and impressing said demodulated signals on said telephone line.

3. In an apparatus for transmitting radio frequencies signals that are modulated in accordance with sound energy impressed upon a telephone microphone, a power amplifier means including a transistor having a base, an emitter, and a collector,
a radio frequency oscillator connected to said base, a push-pull transistor amplifier means inductively coupled to said microphone for amplifying electrical audio signals generated by said microphone in accordance with sound energy impressed thereon, a transformer having a primary winding and a pair of secondary windings, means connecting said push-pull transistor amplifier means to said primary for inducing modulating signals in said pair of secondary windings in accordance with variations in said electrical audio signals, an electrical energy radiating loop interconnected between said collector and a first of said pair of secondary windings for modulating the radio frequency output of said power amplifier means, and means connecting said other of said pair of secondary windings to said emitter for simultaneously modulating said radio frequency output of said power amplifier means.

4. The system set forth in claim 1, which further includes,

R.F. amplifier means connected to said second loop for converting received modulated R.F. signals to audio signals and for impressing said audio signals on said telephone line, means responsive to the receipt of a modulated R.F. signal in said second loop for generating a control output proportional to the D.C. level of said received modulated R.F. signals, and means responsive to said control output for maintaining the gains of said R.F. amplifier means and said normally deenergized audio power amplifier respectively constant.

5. The system set forth in claim 2 wherein the means for impressing audio signals on the telephone line includes an audio amplifier and which system further includes, a second radio frequency amplifier interposed between said second loop and said demodulating means, and means responsive to the D.C. level of the output of said second radio frequency amplifier for accordingly varying the respective gains of said second radio frequency amplifier and said audio amplifier.

References Cited by the Examiner

UNITED STATES PATENTS

| | | | |
|---|---|---|---|
| 1,923,543 | 8/1933 | Lawrence | 332—49 |
| 2,419,833 | 4/1947 | Grimes | 179—82 |
| 2,507,728 | 5/1950 | Marlowe | 179—82 |
| 2,574,777 | 11/1951 | Doucette | 179—82 |
| 2,596,013 | 5/1952 | Doriot | 179—82 |
| 2,629,858 | 2/1953 | Koros | 332—31 |
| 2,855,568 | 10/1958 | Lin | 332—31 X |
| 2,912,569 | 11/1959 | Shepherd | 325—45 X |
| 2,935,606 | 5/1960 | Harrison et al. | 325—16 |
| 3,101,447 | 8/1963 | Smith | 325—105 |
| 3,105,938 | 10/1963 | Onnigian et al. | 325—105 |
| 3,124,657 | 3/1964 | Peterson | 179—41 X |
| 3,182,137 | 5/1965 | Beatty | 179—170.8 |
| 3,193,623 | 7/1965 | Burns et al. | 179—41 |

References Cited by the Applicant

UNITED STATES PATENTS

| | | |
|---|---|---|
| 2,129,332 | 9/1938 | Mastini. |
| 2,894,121 | 7/1959 | Phillips. |
| 3,064,209 | 11/1962 | Pospischil et al. |

DAVID G. REDINBAUGH, *Primary Examiner.*

JOHN W. CALDWELL, *Examiner.*